United States Patent
Kang et al.

(10) Patent No.: US 10,469,151 B2
(45) Date of Patent: Nov. 5, 2019

(54) BEAM SCANNING METHOD OF TERMINAL FOR HYBRID BEAM FORMING IN WIRELESS COMMUNICATION SYSTEM, AND DEVICE FOR SAME

(71) Applicant: LG ELECTRONICS INC., Seoul (KR)

(72) Inventors: Jiwon Kang, Seoul (KR); Kitae Kim, Seoul (KR); Kilbom Lee, Seoul (KR); Kukheon Choi, Seoul (KR); Heejin Kim, Seoul (KR); Kyuseok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/760,069

(22) PCT Filed: May 17, 2016

(86) PCT No.: PCT/KR2016/005201
§ 371 (c)(1),
(2) Date: Mar. 14, 2018

(87) PCT Pub. No.: WO2017/061679
PCT Pub. Date: Apr. 13, 2017

(65) Prior Publication Data
US 2018/0269953 A1   Sep. 20, 2018

Related U.S. Application Data

(60) Provisional application No. 62/238,140, filed on Oct. 7, 2015.

(51) Int. Cl.
*H04B 7/06*   (2006.01)
*H04B 7/0408*   (2017.01)
(Continued)

(52) U.S. Cl.
CPC ......... *H04B 7/0695* (2013.01); *H04B 7/0408* (2013.01); *H04B 7/0617* (2013.01); *H04B 7/088* (2013.01); *H04B 7/0413* (2013.01)

(58) Field of Classification Search
CPC .. H04B 7/0695; H04B 7/0408; H04B 7/0617; H04B 7/088; H04B 7/0413
See application file for complete search history.

(56) References Cited

U.S. PATENT DOCUMENTS 9,369,189 B2 * 6/2016 Yu .................. H04L 5/0053
2013/0072243 A1 * 3/2013 Yu .................. H04B 7/0695
455/509

(Continued)

FOREIGN PATENT DOCUMENTS

KR   10-2015-0000304 A   1/2015
WO   WO 2015/099497 A1   7/2015

*Primary Examiner* — Sophia Vlahos
(74) *Attorney, Agent, or Firm* — Birch, Stewart, Kolasch & Birch, LLP

(57) ABSTRACT

Disclosed in the present application is a method for receiving a downlink signal by a terminal from a base station in a wireless communication system. In particular, the present invention is characterized by comprising the steps of: receiving a beam scanning subframe, configured of a plurality of preambles for scanning transmission means at first intervals, from the base station; selecting a preferred transmission beam corresponding to one preamble from among the plurality of preambles, and a preferred reception beam corresponding to the preferred transmission beam reporting information on the preferred transmission beam to the base station; and receiving the one preamble and a certain subframe configured of a downlink physical channel beam formed by the preferred transmission beam at second intervals within the first interval.

11 Claims, 10 Drawing Sheets

(51) Int. Cl.
*H04B 7/08* (2006.01)
*H04B 7/0413* (2017.01)

(56) References Cited

U.S. PATENT DOCUMENTS

| | | |
|---|---|---|
| 2013/0301454 A1 | 11/2013 | Seol et al. |
| 2014/0126620 A1 | 5/2014 | Maltsev et al. |
| 2015/0009968 A1 | 1/2015 | Yu et al. |
| 2016/0150435 A1* | 5/2016 | Baek .................. H04W 16/28 370/252 |

* cited by examiner

BEAM SCANNING METHOD OF TERMINAL FOR HYBRID BEAM FORMING IN WIRELESS COMMUNICATION SYSTEM, AND DEVICE FOR SAME

CROSS REFERENCE TO RELATED APPLICATIONS

This application is the National Phase of PCT International Application No, PCT/KR2016/005201, filed on May 17, 2016, which claims priority under 35 U.S.C. 119(e) to U.S. Provisional Application No. 62/238,140, filed on Oct. 7, 2015, all of which are hereby expressly incorporated by reference into the present application.

TECHNICAL FIELD

The present invention relates to a wireless communication system, and more particularly, to a beam scanning method of a user equipment for hybrid beamforming in a wireless communication system and apparatus therefor.

BACKGROUND ART

A legacy beamforming technique using multiple antennas can be mainly classified into an analog beamforming technique and a digital beamforming technique depending on a location to which a beamforming weight vector/precoding vector is applied.

First of all, the analog beamforming technique is a typical beamforming technique applied to an initial multi-antenna structure. The analog beamforming technique divides an analog signal of which digital signal processing is completed into a plurality of paths and sets phase-shift (PS) and power amplification (PA) to each of a plurality of the paths to perform beamforming. FIG. 1 is a diagram for an example of a legacy analog beamforming technique.

Referring to FIG. 1, it is able to see a structure that an analog signal derived from a single digital signal is processed by a power amplifier and a phase shifter connected to each antenna to perform analog beamforming. In particular, the phase shifter and the power amplifier process complex weights at an analog stage. In this case, a radio frequency (RF) chain corresponds to a processing block in which a single digital signal is converted into an analog signal.

However, according to the analog beamforming technique, since accuracy of a beam is determined according to characteristics of elements of the phase shifter and the power amplifier, the analog beamforming technique is advantageous for the narrow band transmission due to the control characteristics of the elements. On the other hand, since the analog beamforming technique has a hardware structure incapable of implementing multi-stream transmission, multiplexing gain for increasing a transmission rate is relatively small and it is difficult to perform beamforming per user based on orthogonal resource allocation.

Unlike the analog beamforming technique, the digital beamforming technique performs beamforming at a digital stage using a baseband process to maximize diversity and multiplexing gain in MIMO environment.

Referring to FIG. 2, digital beamforming can be performed by performing precoding in a baseband process. Unlike FIG. 1, an RF chain includes a power amplifier. This is because a complex weight derived for beamforming is directly applied to a transmission data.

And, since the digital beamforming technique is able to differently perform beamforming according to a user, it is able to support multi user beamforming at the same time. Since the digital beamforming technique is able to perform independent beamforming according to a user to which an orthogonal resource is allocated, the digital beamforming technique has characteristics that scheduling flexibility is high and it is able to manage a transmitting end in accordance with a system purpose. Moreover, when a technique such as Multiple-Input Multiple-Output (MIMO)-OFDM (Orthogonal Frequency Division Multiplexing) is applied in a broadband transmission environment, it may form an independent beam for each subcarrier. Therefore, the digital beamforming technique can maximize the maximum transmission rate of a single user based on increased system capacity and enhanced beam gain.

In accordance with the aforementioned advantages and disadvantages, digital beamforming-based MIMO technology has been introduced in the current 3G/4G system.

DISCLOSURE OF THE INVENTION

Technical Task

Based on the aforementioned discussion, the technical task of the present invention is to propose a beam scanning method of a user equipment for hybrid beamforming in a wireless communication system and apparatus therefor.

Technical Solutions

In one technical aspect of the present invention, provided herein is a method of receiving a downlink signal transmitted by a user equipment to a base station in a wireless communication system, including receiving a beam scanning subframe configured with a plurality of preambles for a transmission (Tx) beam scan in a first period from the base station, selecting a preferred Tx beam corresponding to a single preamble among a the plurality of preambles and a preferred reception (Rx) beam corresponding to the preferred Tx beam, reporting information of the preferred Tx beam to the base station, and receiving a specific subframe configured with the single preamble and a downlink physical channel beam-formed with the preferred Tx beam in a second period within the first period.

Here, the first period may include an update period of the preferred Tx beam and the second period may include an update period of the preferred Rx beam.

Preferably, the preferred Rx beam corresponding to the preferred Tx beam is updated using the single preamble during receiving of the specific subframe.

Additionally, the specific subframe may include a preamble corresponding to a Tx beam for a different user equipment. In this case, the single preamble is preferably located at a front end of the downlink physical channel.

Moreover, the method may further include receiving information on the number of the plurality of preambles from the base station in the first period.

In another technical aspect of the present invention, provided herein is a method of transmitting a downlink signal transmitted to a user equipment by a base station in a wireless communication system, including transmitting a beam scanning subframe configured with a plurality of preambles for a transmission (Tx), beam scan in a first period to the base station, receiving information on a preferred Tx beam corresponding to a single preamble among the plurality of preambles from the user equipment, and transmitting a specific subframe configured with the single preamble and a downlink physical channel beam-formed with the preferred Tx beam in a second period within the first period, wherein the user equipment selects a preferred reception (Rx), beam corresponding to the preferred Tx beam from the beam scanning subframe and the specific subframe.

Likewise, the first period may include an update period of the preferred Tx beam and the second period may include an update period of the preferred Rx beam.

Preferably, the specific subframe includes a preamble corresponding to a Tx beam for a different user equipment and the single preamble is located at a front end of the downlink physical channel.

Moreover, the method may further include transmitting information on the number of the plurality of preambles to the user equipment in the first period.

Advantageous Effects

According to an embodiment of the present invention, it is able to perform signal transmission/reception optimized for a radio channel situation using a hybrid beamforming scheme.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE FOR INVENTION

The configuration, operation and other features of the present disclosure will be understood by the embodiments of the present disclosure described with reference to the accompanying drawings.

Hereinafter, a Multiple-Input Multiple-Output (MIMO) system will be described. In the MIMO system, multiple transmission antennas and multiple reception antennas are used. By this method, data transmission/reception efficiency can be improved. That is, since a plurality of antennas is used in a transmitter or a receiver of a wireless communication system, capacity can be increased and performance can be improved. Hereinafter, MIMO may also be called "multi-antenna".

In the multi-antenna technique, a single antenna path is not used for receiving one message. Instead, in the multi-antenna technique, data fragments received via several antennas are collected and combined so as to complete data. If the multi-antenna technique is used, a data transfer rate may be improved within a cell region having a specific size or system coverage may be increased while ensuring a specific data transfer rate. In addition, this technique may be widely used in a mobile communication terminal, a repeater and the like. According to the multi-antenna technique, it is possible to overcome a limit in transmission amount of conventional mobile communication using a single antenna.

Figure 1:
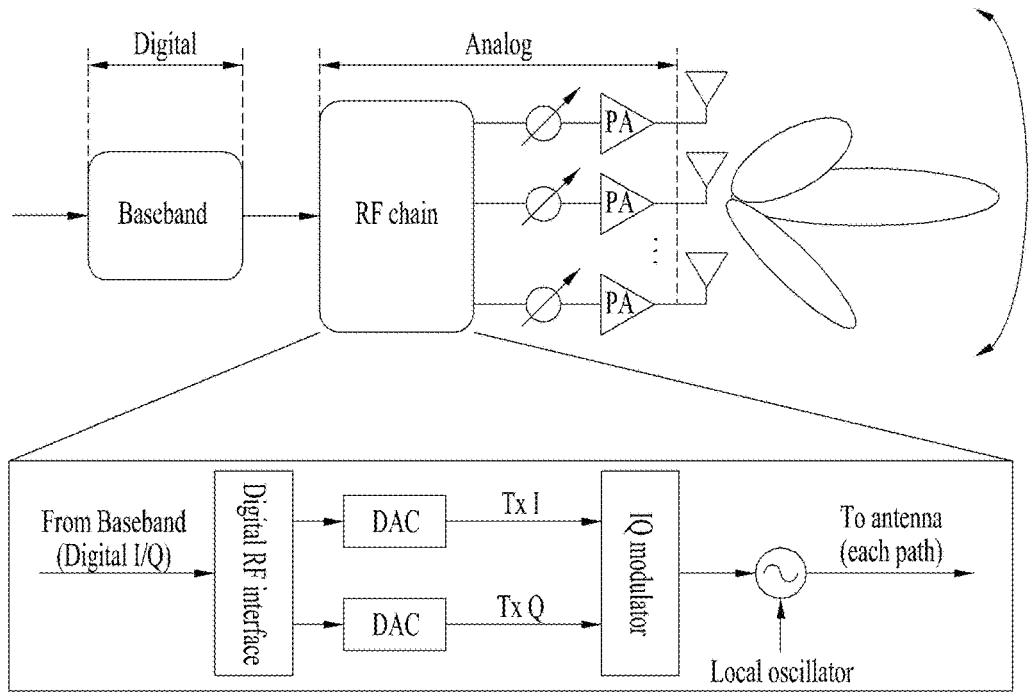
FIG. 1 is a diagram for an example of a legacy analog beamforming technique.
Figure 2:
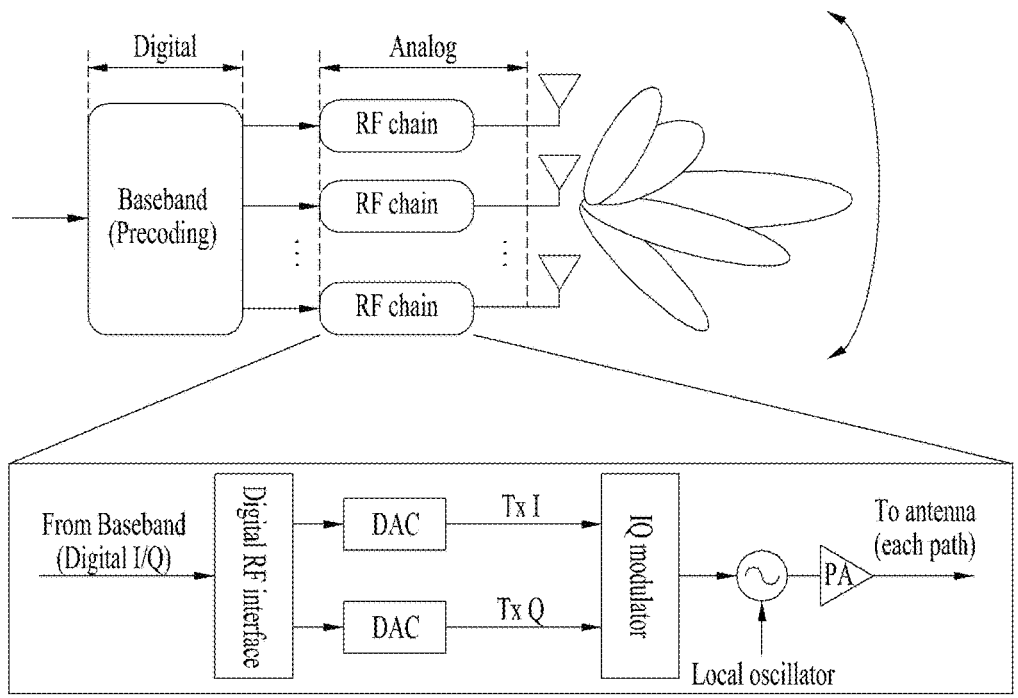
FIG. 2 is a diagram for an example of a legacy digital beamforming technique.
Figure 3:
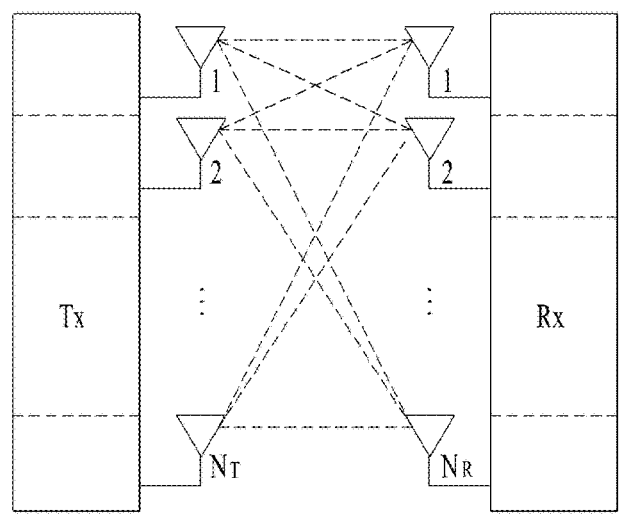
FIG. 3 is a diagram showing the configuration of a general multiple input multiple output (MIMO) system.

The configuration of the general multi-antenna (MIMO) communication system is shown in FIG. 3. $N_T$ transmission antennas are provided in a transmitter and $N_R$ reception antennas are provided in a receiver. If the multiple antennas are used in both the transmitter and the receiver, theoretical channel transmission capacity is increased as compared with the case where multiple antennas are used in only one of the transmitter or the receiver. The increase in the channel transmission capacity is proportional to the number of antennas. Accordingly, transfer rate is improved and frequency efficiency is improved. If a maximum transfer rate in the case where one antenna is used is $R_o$, a transfer rate in the case where multiple antennas are used can be theoretically increased by a value obtained by multiplying $R_o$ by a rate increase ratio $R_i$ as shown in [Equation 1] below. Here, $R_i$ is the smaller of the two values $N_T$ and $N_R$.

$$R_i = \min(N_T, N_R) \quad \text{[Equation 1]}$$

For example, in a MIMO system using four transmit antennas and four reception antennas, it is possible to theoretically acquire a transfer rate which is four times that of a single antenna system. After the theoretical increase in the capacity of the MIMO system was proved in the mid-1990s, various technologies of substantially improving a data transmission rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. As shown in FIG. 3, it is assumed that $N_T$ transmit antennas and $N_R$ reception antennas are present. In transmitted signals, if the $N_T$ transmit antennas are present, the number of pieces of maximally transmittable information is $N_T$. The transmitted information may be expressed by a vector shown in [Equation 2] below.

$$s = [s_1, s_2, \ldots, s_{N_T}]^T \quad \text{[Equation 2]}$$

The transmitted information $s_1, s_2, \ldots, s_{N_T}$ may have different transmit powers. If the respective transmit powers are $P_1, P_2, \ldots, P_{N_T}$, the transmitted information with adjusted powers may be expressed by a vector shown in [Equation 3] below.

$$\hat{s}=[\hat{s}_1,\hat{s}_2,\ldots,\hat{s}_{N_T}]^T=[P_1 s_1, P_2 s_2, \ldots, P_{N_T} s_{N_T}]^T \qquad \text{[Equation 2]}$$

In addition, $\hat{s}$ may be expressed using a diagonal matrix P of the transmit powers as shown in [Equation 4] below.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Considers that the $N_T$ actually transmitted signals $x_1, x_2, \ldots, x_{N_T}$ are configured by applying a weight matrix W to the information vector $\hat{s}$ with the adjusted transmit powers. The weight matrix serves to appropriately distribute the transmitted information to each antenna according to a transport channel state, etc. Such transmitted signals $x_1, x_2, \ldots, x_{N_T}$ may be expressed by using a vector X as shown in [Equation 5] below. $W_{ij}$ denotes a weight between an i-th transmit antenna and j-th information. W is also called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{12} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

In general, the physical meaning of the rank of the channel matrix may be a maximum number of elements capable of transmitting different information via a given channel. Accordingly, since the rank of the channel matrix is defined as the smaller of the number of independent rows or columns, the rank of the matrix is not greater than the number of rows or columns. The rank rank(H) of the channel matrix H is mathematically expressed by [Equation 6].

$$\text{rank}(H) \leq \min(N_T, N_R) \qquad \text{[Equation 6]}$$

In addition, different information transmitted using the MIMO technology is defined as "transmitted stream" or "stream". Such "stream" may be referred to as "layer". Then, the number of transmitted streams is not greater than the rank which is a maximum number capable of transmitting different information. Accordingly, the channel rank H is expressed by [Equation 7] below.

$$\text{\# of streams} \leq \text{rank}(H) \leq \min(N_T, N_R) \qquad \text{[Equation 7]}$$

where, "# of streams" denotes the number of streams. It should be noted that one stream may be transmitted via one or more antennas.

There are various methods for associating one or more streams with several antennas. These methods will be described according to the kind of the MIMO technology. A method of transmitting one stream via several antennas is referred to as a spatial diversity method and a method of transmitting several streams via several antennas is referred to as a spatial multiplexing method. In addition, a hybrid method which is a combination of the spatial diversity method and the spatial multiplexing method may be used.

In the following, a massive MIMO environment in which the number of transmission and reception antennas is considerably increased is explained. In general, in cellular communication, it is assumed that maximum 8 transmission/reception antennas are applied to a MIMO environment. However, as evolving into massive MIMO, the number of antennas may increase more than dozens or several hundreds of antennas.

If a digital beamforming technique is applied in a massive MIMO environment, since it is necessary to perform signal processing on hundreds of antennas for digital signal processing of a transmitting end through a baseband process, signal processing complexity becomes very complex and hardware implementation complexity becomes very complex because RF chains as many as the number of antennas are necessary. In addition, since it is necessary to perform independent channel estimation on all antennas and have feedback information on a huge MIMO channel consisting of all antennas in case of a FDD (frequency division duplex) system, a pilot and a feedback overhead become very big. On the other hand, if an analog beamforming technique is applied in the massive MIMO environment, hardware complexity of a transmitting end is relatively low, but performance enhancement using multiple antennas is insignificant and flexibility of resource allocation is degraded. In particular, in case of performing broadband transmission, it is very difficult to control a beam according to a frequency.

Therefore, in the massive MIMO environment, it is necessary to have a scheme of configuring a transmitting end of a hybrid type that an analog beamforming structure and a digital beamforming structure are combined instead of exclusively selecting one of the analog beamforming and the digital beamforming techniques Table 1 in the following shows relationship between a performance gain and complexity of the analog beamforming technique and the digital beamforming technique. It is necessary to design a structure of a transmitting end of a hybrid type capable of reducing the hardware implementation complexity of the transmitting end and maximizing a beamforming gain using the massive antenna based on the relationship.

TABLE 1

|  | Easy of beamforming accuracy control | Multi-carrier beam control | Multi-stream transmission | Hardware complexity (BB process) | Pilot and feedback overhead |
|---|---|---|---|---|---|
| Analog beamforming technique | low | impossible or difficult | impossible or difficult | low | low |

TABLE 1-continued

|  | Easy of beamforming accuracy control | Multi-carrier beam control | Multi-stream transmission | Hardware complexity (BB process) | Pilot and feedback overhead |
|---|---|---|---|---|---|
| Digital beamforming technique | high | possible | possible | high | high |

In the following, hybrid beamforming is explained in more detail.

Figure 4:
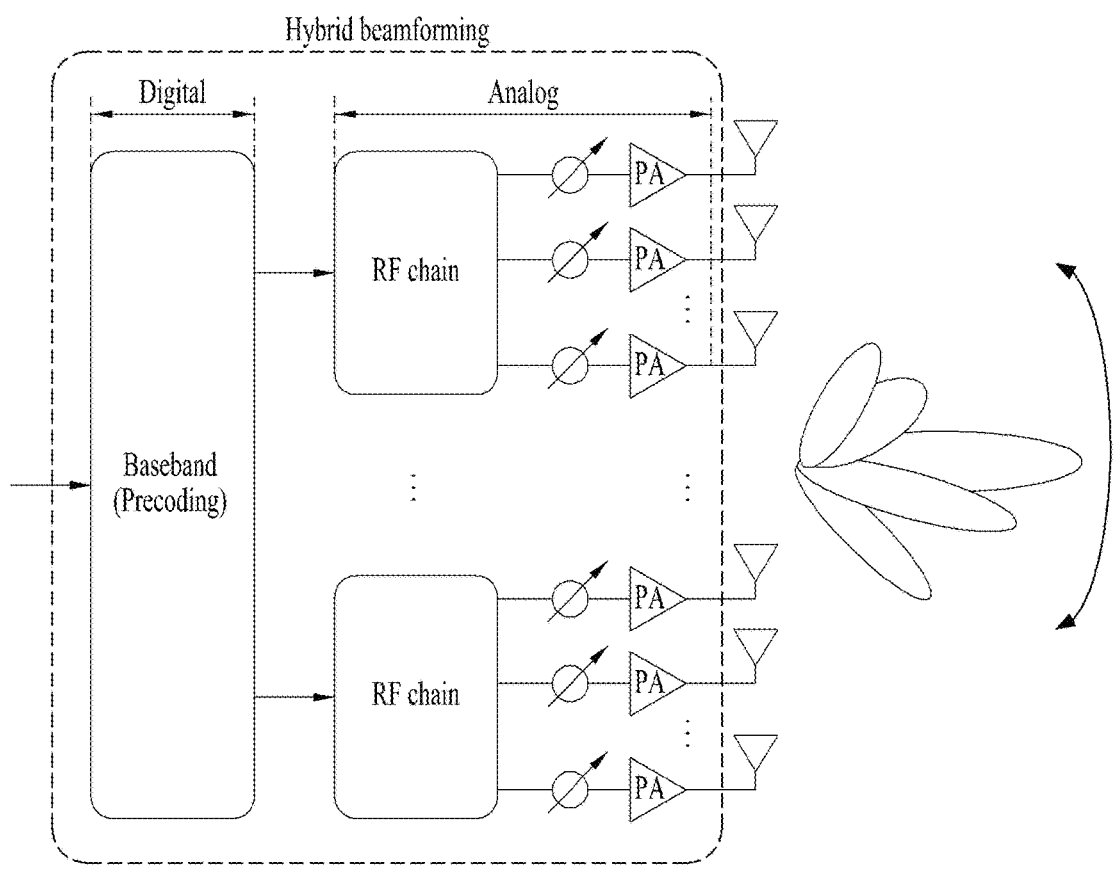
FIG. 4 is a diagram for explaining a concept of hybrid beamforming.

The hybrid beamforming is performed to configure a transmitting end capable of reducing hardware complexity and achieving characteristics of the analog beamforming technique and advantages of the digital beamforming technique. FIG. 4 is a diagram for explaining a concept of hybrid beamforming.

Referring to FIG. 4, the hybrid beamforming is a structure that performs coarse beamforming using the analog beamforming technique and performs multi-stream or multi-user transmission using the digital beamforming technique. Consequently, the hybrid beamforming has a structure for simultaneously performing the analog beamforming technique and the digital beamforming technique to lower implementation complexity of a transmitting end or hardware complexity. Basically, technical issues of the hybrid beamforming are described in the following.

- Optimization considering both analog and digital beamforming at the same time has the following difficulties. Basically, the digital beamforming has an identical time-frequency resource and can apply an independent beamforming technique to each user. On the contrary, the analog beamforming has a limitation that it is necessary to apply a common beamforming technique with an identical time-frequency resource. Hence, the limitation causes such an optimization constraint as the number of supported ranks, beam control flexibility, beamforming decomposition, and the like.
- The analog beamforming technique, which forms a beam only in a specific direction in the same time-frequency resource, is unable to perform multiple beamforming in all UEs directions at the same time. Hence, there is a problem that it is impossible to simultaneously transmit a UL/DL control channel, a reference signal, a synchronization signal, and the like to all UEs capable of being distributed to all areas of a cell.
- In case of performing estimation on an analog/digital beam, although the digital beam is able to use a legacy orthogonal pilot allocation scheme as it is, the analog beam requires a predetermined time-duration as many as the number of beam candidates. This means that time delay required for the analog beam estimation is not small. And, if the analog beam and the digital beam are estimated at the same time, complexity can be considerably increased.
- Lastly, while the digital beamforming technique is able to easily perform beamforming for multi-user/stream, the analog beamforming technique performs same beamforming on the entire transmission band. Hence, it is difficult to perform independent beamforming according to a user or a stream. In particular, since it is difficult to support FDMA (e.g., OFDMA) through orthogonal frequency resource allocation, it may be difficult to achieve optimization of frequency resource efficiency.

Among the aforementioned technical issues, an object of the present disclosure is to provide a method capable of solving analog/digital beam estimation complexity for hybrid beamforming.

Figure 5:
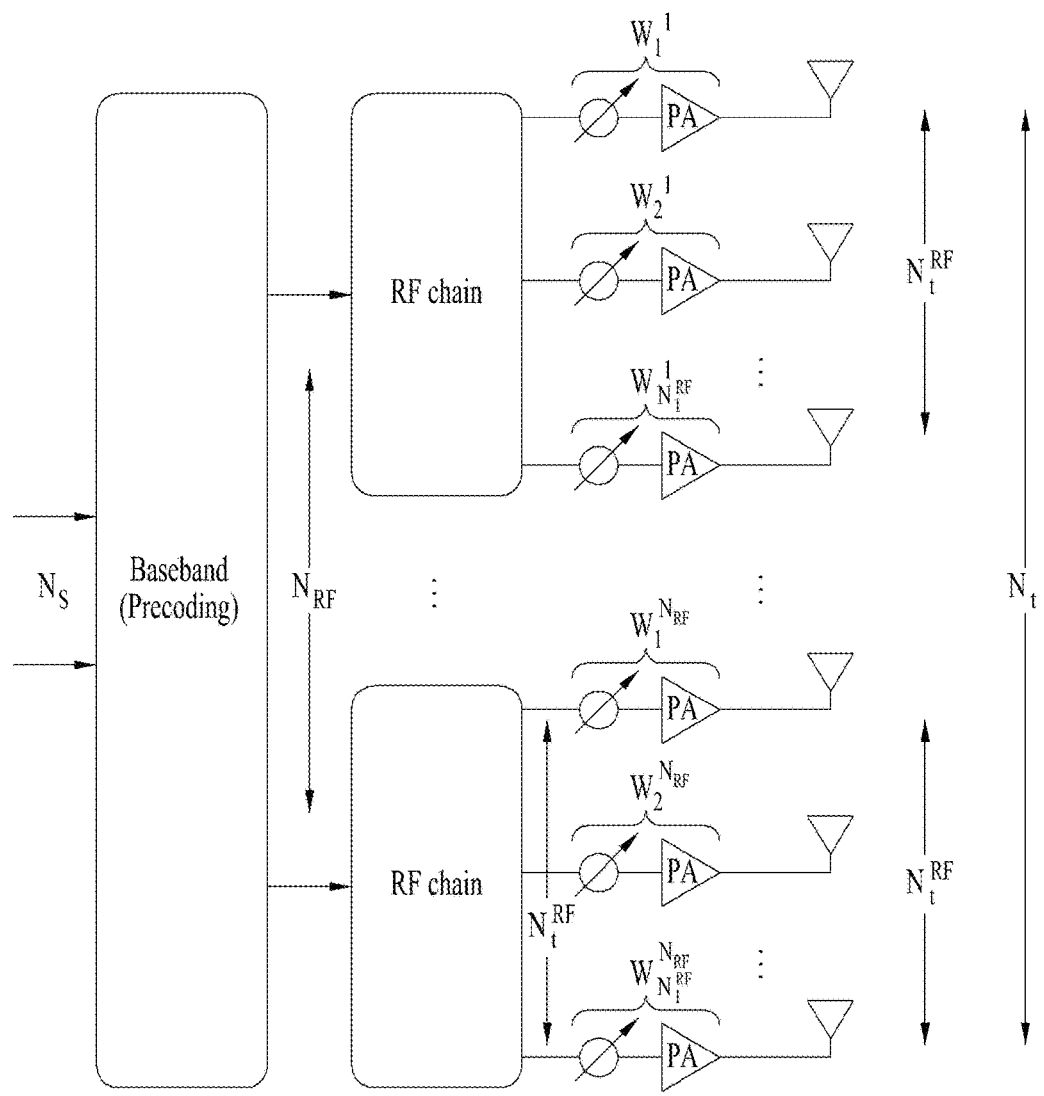
FIG. 5 is a diagram for a structure of a transmitting end that performs hybrid beamforming.

FIG. 5 is a diagram for a structure of a transmitting end that performs hybrid beamforming. In particular, in FIG. 5, assume that the transmitting end performing hybrid beamforming is equipped with $N_t^{RF}$ number of independent antennas only according to an RF chain.

In this case, such a relationship as $N_t = N_t^{RF} \times N_{RF}$ is established between the number of all antennas and the number of antennas according to an RF chain. Since a signal, which has passed a phase shifter and a power amplifier, is independently transmitted to a transmission antenna at the end, it may assume such a system model as [Equation 8] in the following.

$$y_k = H_k F_k^{RF} F_k^{BB} s_k + z_k \quad \text{[Equation 8]}$$

In [Equation 8], $y_k$ corresponds to a reception signal vector ($N_r \times 1$) on a subcarrier where an index corresponds to k, $H_k$ corresponds to a $N_r \times N_t$ channel matrix on a subcarrier where an index corresponds to k, $F^{RF}$ corresponds to an RF precoder having a size of $N_t \times N_t$ on all subcarriers, and the RF precoder is identically applied to all subcarriers. Moreover, $F_k^{BB}$ corresponds to a baseband precoder having a size of $N_{RF} \times N_S$ on a subcarrier where an index corresponds to k and the baseband precoder can be changed according to a subcarrier. In addition, $s_k$ corresponds to a transmission signal vector ($N_S \times 1$) on a subcarrier where an index corresponds to k and $z_k$ corresponds to a noise signal vector ($N_r \times 1$) on a subcarrier where an index corresponds to k.

And, the subcarrier index k has values ranging from 0 to $N_{FFT}-1$. In this case, the $N_{FFT}$ is a FFT (Fast Fourier Transform) size and corresponds to the number of total subcarriers. And, $N_{RF}$ indicates the number of total RF chains, $N_t$ indicates the number of total antennas of a transmitting end, and $N_t^{RF}$ corresponds to the number of transmission antennas installed according to an RF chain. Lastly, $N_r$ indicates the number of total antennas of a receiving end and $N_s$ indicates the number of transmission data streams.

Meanwhile, if [Equation 8] is developed for a subcarrier k, it can be represented as [Equation 9] in the following.

$$\begin{bmatrix} y^{(1)} \\ M \\ y^{(N_r)} \end{bmatrix} = \begin{bmatrix} h_{11} & h_{12} & \Lambda & h_{1N_t} \\ h_{21} & h_{22} & \Lambda & h_{2N_t} \\ M & M & O & M \\ h_{N_r 1} & h_{N_r 2} & \Lambda & h_{N_r N_t} \end{bmatrix} \quad \text{[Equation 9]}$$

$$F^{RF} \begin{pmatrix} \begin{bmatrix} v_{1,1} & v_{1,2} & \Lambda & v_{N_{RF}, N_S} \\ v_{2,1} & v_{2,2} & \Lambda & v_{N_{RF}, N_S} \\ M & M & O & M \\ v_{N_{RF}, 1} & v_{N_{RF}, 2} & \Lambda & v_{N_{RF}, N_S} \end{bmatrix} \begin{bmatrix} x^{(1)} \\ M \\ x^{(N_S-1)} \end{bmatrix} \end{pmatrix} + \begin{bmatrix} z^{(1)} \\ M \\ z^{(N_r)} \end{bmatrix}$$

In this case, an equivalent precoding matrix $F^{RF}$ ($N_t \times N_R$) of analog beamforming formed by a phase shifter and a power amplifier after an RF chain can be represented as [Equation 10] in the following.

$$F^{RF} = \begin{bmatrix} w^1_{N_t^{RF}} & 0 & 0 & \Lambda & 0 \\ 0 & w^2_{N_t^{RF}} & 0 & \Lambda & 0 \\ 0 & 0 & w^3_{N_t^{RF}} & \Lambda & 0 \\ M & M & M & O & M \\ 0 & 0 & 0 & \Lambda & w^{N_{RF}}_{N_t^{RF}} \end{bmatrix} \quad \text{[Equation 10]}$$

And, a weight per RF chain of an RF precoder $F^{RF}$ can be represented as [Equation 11] in the following.

$$w^j_{N_t^{RF}} = \begin{bmatrix} w^j_1 \\ w^j_2 \\ M \\ w^j_{N_t^{RF}} \end{bmatrix} \quad \text{[Equation 11]}$$

In the following, a beam radiation pattern of hybrid beamforming for a ULA (uniform linear array) antenna is explained. An array response vector of the ULA antenna can be represented as [Equation 12] in the following.

$$a(\theta) = \left[ 1 \; \exp\left( j2\pi \times 1 \times \frac{d}{\lambda}\sin(\theta)\right) \; \exp\left( j2\pi \times 2 \times \frac{d}{\lambda}\sin(\theta)\right) \; \Lambda \; \exp\left( j2\pi \times (N_t - 1) \times \frac{d}{\lambda}\sin(\theta)\right) \right]^T \quad \text{[Equation 12]}$$

In [Equation 12], $\lambda$ corresponds to a wave-length and d indicates a distance between antennas. In order to represent an antenna radiation pattern of a hybrid beamformer, for clarity, assume that the number of RF chains corresponds to 4 and the number of analog antennas per RF chain corresponds to 4.

Figure 6:
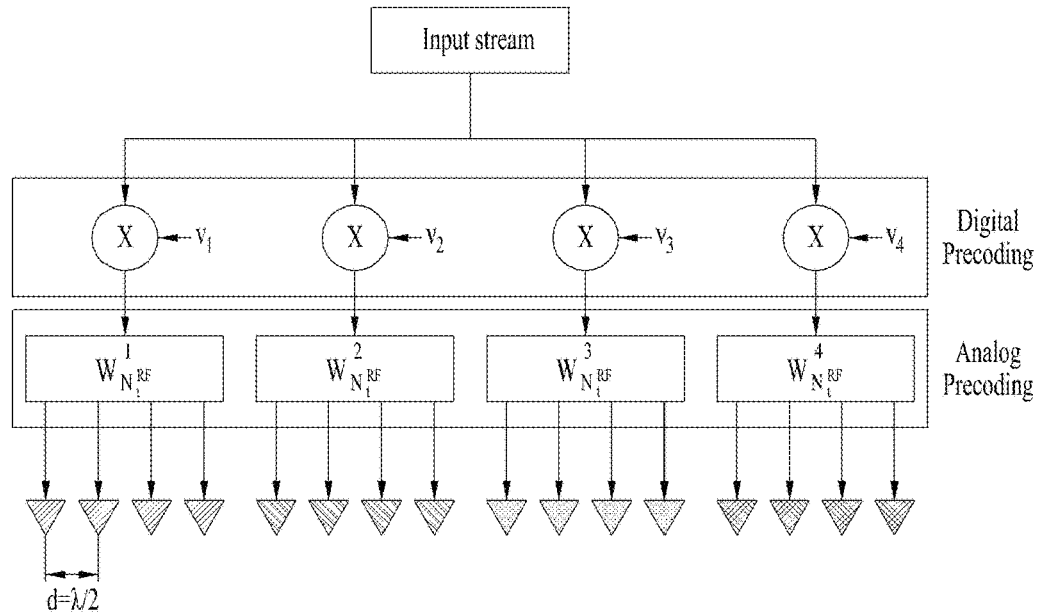
FIG. 6 is a diagram for 16 ULA antenna structure consisting of 4 RF chains.

FIG. 6 is a diagram for 16 ULA antenna structure consisting of 4 RF chains. In particular, in FIG. 6, the total number of transmission antennas corresponds to 16 and it becomes $d=\lambda/2$. A phase shifter and a power amplifier of an analog terminal can be represented by a beamforming weight, i.e., a precoder. The precoder can be represented as [Equation 13] in the following.

$$F^{RF} = \begin{bmatrix} w^1_{N_t^{RF}} & 0 & 0 & 0 \\ 0 & w^2_{N_t^{RF}} & 0 & 0 \\ 0 & 0 & w^3_{N_t^{RF}} & 0 \\ 0 & 0 & 0 & w^4_{N_t^{RF}} \end{bmatrix}, \quad \text{[Equation 13]}$$

$$w^j_{N_t^{RF}} = \begin{bmatrix} w^j_1 \\ w^j_2 \\ w^j_3 \\ w^j_4 \end{bmatrix}$$

In this case, a rank-1 weight vector to be applied at a digital beamforming end is defined as [Equation 14] below.

$$F^{BB} = v_1 = [v_1 v_2 v_3 v_4]^T \quad \text{[Equation 14]}$$

At the boresight ($\theta=0°$), all antenna array response vectors to which digital beamforming of [Equation 13] is applied may be represented as [Equation 15]. In this case, a distance d between antennas is assumed to be $\lambda/2$.

$$\sum a(\theta) = \quad \text{[Equation 15]}$$
$$\sum_{i=0}^{15} a_i(\theta) = (1 + \exp(j\pi \times \sin(\theta)) + \exp(j\pi 2 \times \sin(\theta)) +$$
$$\exp(j\pi 3 \times \sin(\theta))) \times v_1 +$$
$$(\exp(j\pi 4 \times \sin(\theta)) + \exp(j\pi 5 \times \sin(\theta)) +$$
$$\exp(j\pi 6 \times \sin(\theta)) + \exp(j\pi 7 \times \sin(\theta))) \times v_2 +$$
$$(\exp(j\pi 8 \times \sin(\theta)) + \exp(j\pi 9 \times \sin(\theta)) +$$
$$\exp(j\pi 10 \times \sin(\theta)) + \exp(j\pi 11 \times \sin(\theta))) \times v_3 +$$
$$(\exp(j\pi 12 \times \sin(\theta)) + \exp(j\pi 13 \times \sin(\theta)) +$$
$$\exp(j\pi 14 \times \sin(\theta)) + \exp(j\pi 15 \times \sin(\theta))) \times v_4$$

Equation 15 is summarized to derive the result shown in Equation 16.

$$\sum a(\theta) = (1 + \exp(j\pi \times \sin(\theta)) + \quad \text{[Equation 16]}$$
$$\exp(j\pi 2 \times \sin(\theta)) +$$
$$\exp(j\pi 3 \times \sin(\theta))) \times (v_1 +$$
$$\exp(j\pi 4 \times \sin(\theta)) \cdot$$
$$v_2 + \exp(j\pi 8 \times \sin(\theta)) \cdot v_3 +$$
$$\exp(j\pi 12 \times \sin(\theta)) \cdot v_4)$$
$$= \left( \sum_{i=1}^{4} s_i \right) \times \left( \sum_{i=1}^{4} t_i \right) = \sum s \times \sum t$$

In Equation 16, s is a beam bound vector and can be expressed as Equation 17. In Equation 16, t is a beam gain/adjustment vector and can be expressed as Equation 18.

$$s = \begin{bmatrix} 1 \\ e^{j\pi \sin(\theta)} \\ e^{j\pi 2 \sin(\theta)} \\ e^{j\pi 3 \sin(\theta)} \end{bmatrix} \quad \text{[Equation 17]}$$

$$t = \begin{bmatrix} 1 & 0 & 0 & 0 \\ 0 & e^{j\pi 4 \sin(\theta)} & 0 & 0 \\ 0 & 0 & e^{j\pi 8 \sin(\theta)} & 0 \\ 0 & 0 & 0 & e^{j\pi 12 \sin(\theta)} \end{bmatrix} \begin{bmatrix} v_1 \\ v_2 \\ v_3 \\ v_4 \end{bmatrix} \quad \text{[Equation 18]}$$

Here, the beam bound vector s determines a total valid range. And, a range of digital beamforming is limited to a corresponding region.

Figure 7:
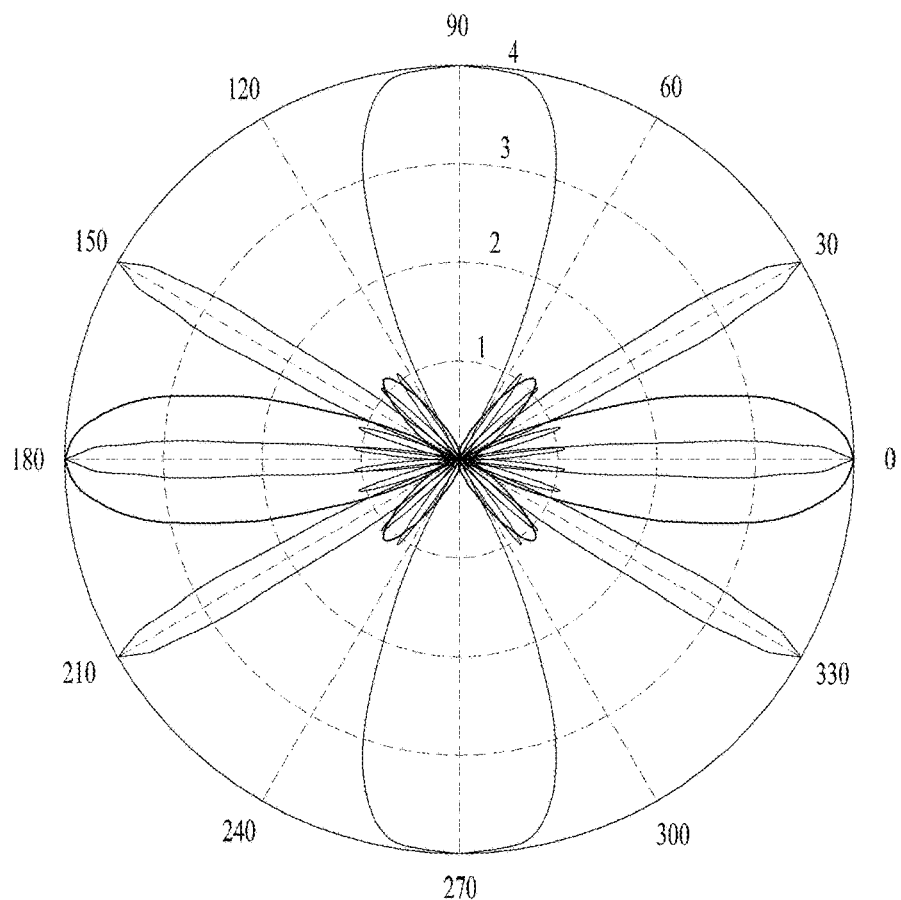
FIG. 7 is a diagram for beam patterns of a beam boundary vector and a beam coordination vector.

FIG. 7 is a diagram for beam patterns of a beam boundary vector and a beam coordination vector. In particular, FIG. 7 assumes $N_t=16$, $N_t^{RF}=4$, $N_{RF}=4$. A beam pattern of the beam boundary vector is expressed by a thick line and a beam pattern of the beam coordination vector is expressed by a thin line.

Figure 8:
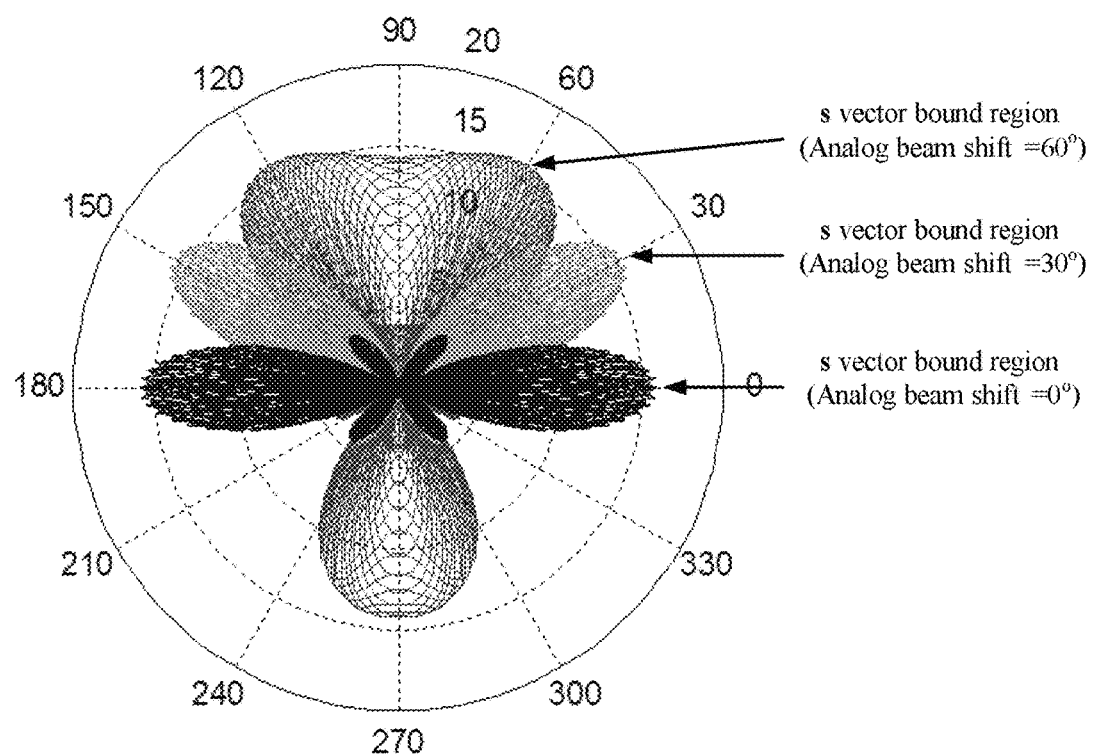
FIG. 8 is a diagram for a beam pattern of a final antenna array response vector according to analog beam shift.

FIG. 8 is a diagram for a beam pattern of a final antenna array response vector according to analog beam shift. Similarly, FIG. 8 assumes $N_t=16$, $N_t^{RF}=4$, $N_{RF}=4$. In FIG. 8, an accumulated beam pattern result to which $v_1=[v_1\ v_2\ v_3\ v_4]^T$ for determining digital beamforming is applied is shown.

Referring to FIGS. 7 and 8, it is able to see that a range of a valid beam is restricted by a beam boundary vector$^s$.

As described above, although beamforming of an analog end is determined in a specific direction by fixing $F^{RD}$ and all $F^{BB}=v$ is applied for digital beamforming, a beam pattern is limited by a beam bound vector s. Therefore, a user equipment can predict an accurate direction through a difference between a reference beam gain and a beam gain formed by a bounded beam.

In the present invention, a fast analog beam scanning method for reducing beam scanning complexity and search time for analog beamforming is described. A transceiving structure generally employing analog beamforming can consider a pure analog beamforming transceiving end and a hybrid beamforming transceiving end. Generally, analog beam scanning enables estimation on a single beam for the same time. Hence, a training time required for beam scanning is proportional to the total beam candidate number.

As described above, the pure analog beamforming should have a beam scanning process in a time domain for transceiving end beam estimation. Namely, for analog beam estimation, a time of # of each Tx/Rx beam $K_T \times K_R$ is necessary. If an analog beam estimation process is ended, a user equipment (UE) can feed back a beam identifier (ID) having the highest signal strength to a base station.

When a time $t_s$ is set for a single beam scanning, an estimation time $T_s$ for all transceived beams can be represented as Equation 19.

$$T_S = t_s \times (K_T \times K_R) \qquad \text{[Equation 19]}$$

Referring to Equation 19, assuming that total Tx (transmitted) beam number $K_T=L$ and Rx (received) beam number $K_R=1$, the total beam candidate number become L. Hence, L time intervals are required in a time domain.

Figure 9:
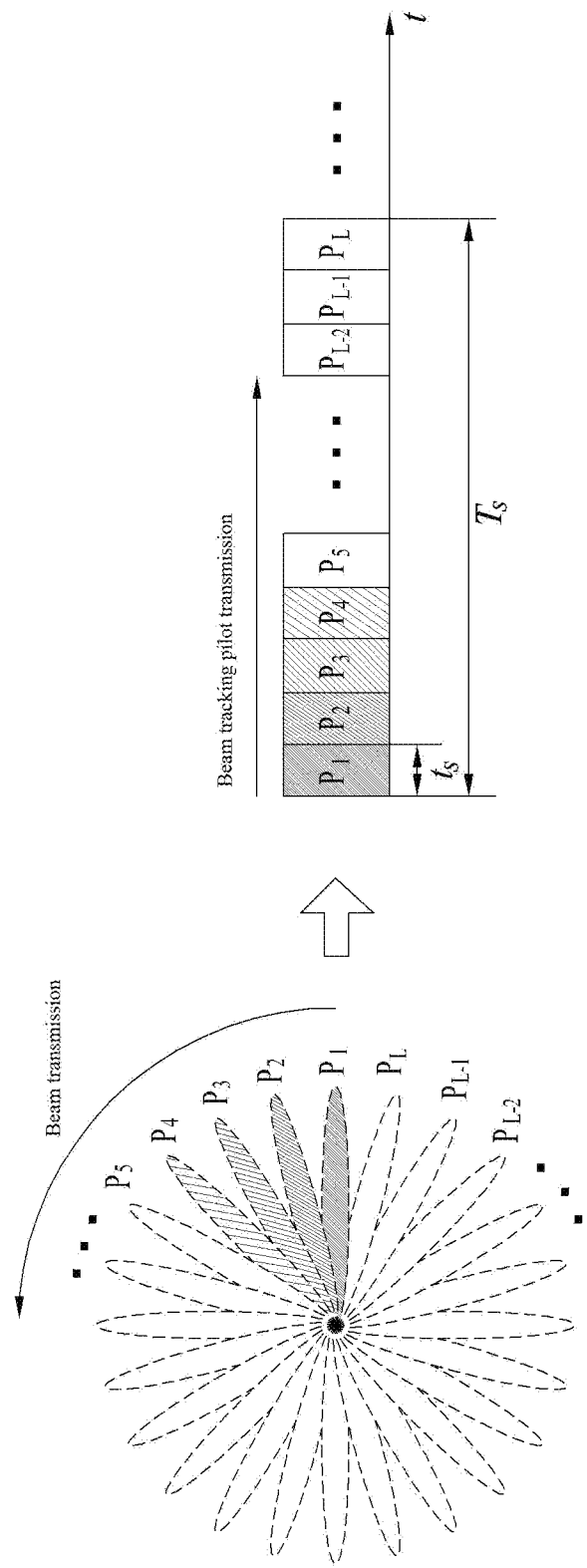
FIG. 9 is a diagram illustrating an example of a beam estimation interval in a time domain required for analog beam tracking.

FIG. 9 is a diagram illustrating an example of a beam estimation interval in a time domain required for analog beam tracking.

Referring to FIG. 9, for analog beam estimation, 1 beam estimation is possible in a single time interval. And, it can be observed that L time intervals are necessary for total L beam estimations. So to speak, as the individual beam number increases more due to the increasing Tx/Rx antenna number, it can be observed that a longer training time is necessary.

Hence, since analog beamforming changes a size and phase angle of a continuous waveform of a time domain after DAC, a training interval for an individual beam should be secured unlike digital beamforming. The longer this interval becomes, the more the throughput loss of a system increases. When additional beam scanning is performed for UE's movement and channel change, the throughput loss of the system may further increase.

In an analog beamforming end, for which a beam training interval in a hybrid beamformer is mandatory, a training time increases in proportion to a size of a search space of a beam. As it is expected to form a sharper beam in the future owing to the increase of physical antennas of a Tx/Rx end, a beam search space further increases like Table 2 in consideration of a Tx/Rx beam width and an antenna structure from an existing 2D channel to a 3D channel.

TABLE 2

| Beamwidth | | 1° | 2° | 5° | 10° |
|---|---|---|---|---|---|
| 2D | Search space | 360 | 180 | 72 | 36 |
| | Exhaustive candidates (Tx beam + Rx beam) | $360^2$ | $180^2$ | $72^2$ | $36^2$ |
| 3D | Search space | 129,600 | 32,400 | 5,184 | 1,296 |
| | Exhaustive candidates (Tx beam + Rx beam) | $129,600^2$ | $32,400^2$ | $5,184^2$ | $1,296^2$ |

Moreover, an approximate beam training time according to a search space increase, i.e., a search time is estimated as follows. Yet, for clarity of description, Table 3 in the following is limited to a 2D channel. Referring to Table 3, if a search space increases 10 times, it can be observed that a search time increases 100 times.

TABLE 3

| Beamwidth | | 1° | 2° | 5° | 10° |
|---|---|---|---|---|---|
| 2D | Search space (Tx beam + Rx beam) | 720 | 360 | 144 | 72 |
| | Exhaustive search time | 5.37 s | 1.34 s | 215.0 ms | 53.8 ms |

As describe above, if both a base station and a UE perform analog beamforming, for downlink (DL) transmission, the base station and the UE should perform an analog beam scanning process for Tx beam configuration and an analog beam scanning process for Rx beam configuration, respectively.

Figure 10:
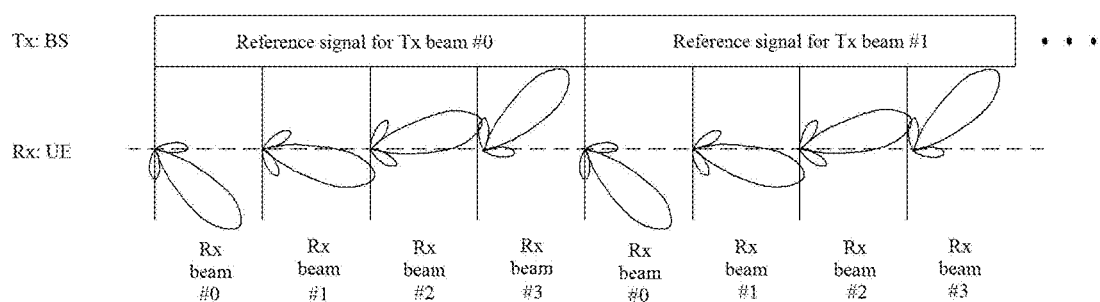
FIG. 10 is a diagram illustrating an example of a process for scanning a Tx beam and a Rx beam.

FIG. 10 is a diagram illustrating an example of a process for scanning a Tx beam and a Rx beam.

Referring to FIG. 10, while a base station transmits a preamble (e.g., a reference signal or a pilot signal) for a multitude of Tx beam candidates, a UE can find an optimal combination of Tx beam and Rx beam by applying Rx beam candidates. Particularly, FIG. 10 shows an example that a Rx beam scanning process is performed total 4 times within a single Tx beam scanning period. The UE should inform the base station of Tx beam information, which is to be applied by the base station, in the optimal Tx/Rx beam information found by the UE through the above process.

Yet, it may cause a problem that the Tx/Rx beam combination of the base station and UE, which is found by the UE, may be changed in response to a movement of the UE. The change of the optimal Tx beam may mainly occur by a location movement of the UE or a blockage environment change around the UE. And the change of the optimal Rx beam may occur by a short-term change like a rotation of the UE as well as a relatively long-term change. Particularly, in case of considering a UE of a type such as a smartphone, if a user slightly moves a hand having the UE held therein only, a reference axis of the UE is changed. Hence, an optimal Rx beam should be changed.

Eventually, scanning or tracking of Rx beam should occur more frequently than that of Tx beam. So to speak, if a time limit in which Tx beam scanning/tracking should occur is set to N and a time limit in which Rx beam scanning/tracking should occur is set to M, the relationship of 'M<N' is established.

In order to meet this, an easiest but inefficient method is to transmit a preamble set all in each time M smaller than N. This is described with reference to the accompanying drawing.

Figure 11:
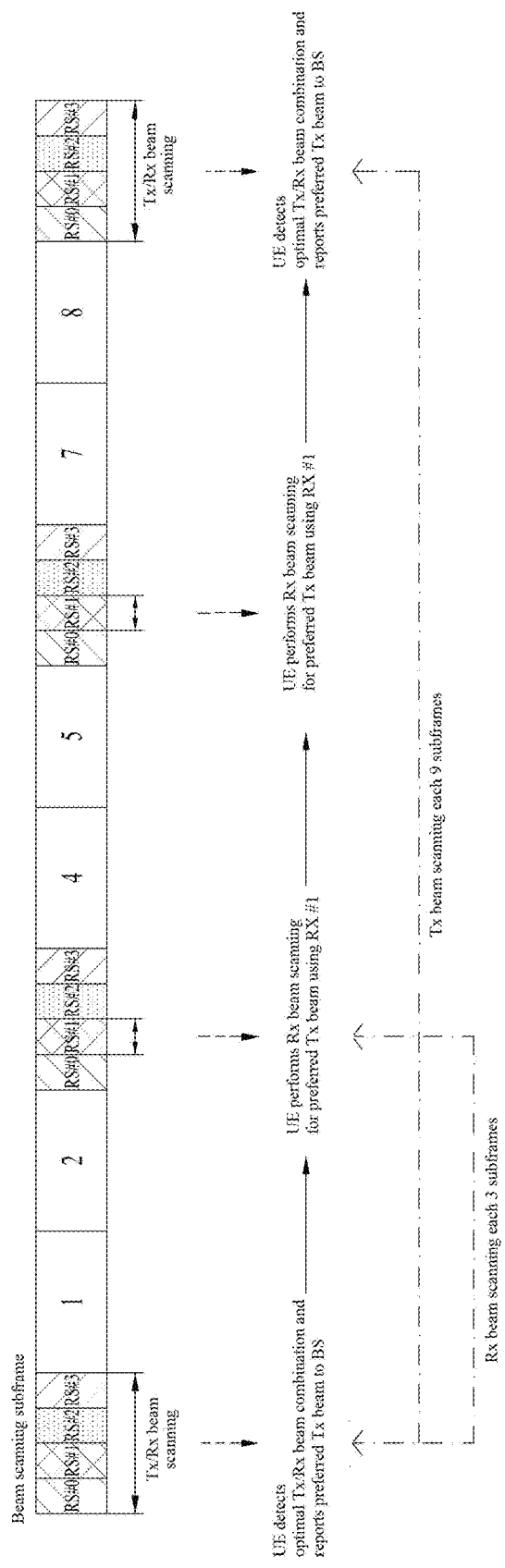
FIG. 11 shows an example of defining a subframe for beam scanning separately.

FIG. 11 shows an example of defining a subframe for beam scanning separately. FIG. 11 shows a case of designating a beam scanning subframe each time M, in which N and M are assumed as 9 and 3, respectively.

Referring to FIG. 11, in subframe #3 or #6, a UE performs Rx beam scanning on a Tx beam selected each 9 subframes only. In doing so, since a multitude of UEs will prefer different Tx beams, respectively, a base station should transmit a multitude of preambles in the subframe #3 or #6 as well. Eventually, the method shown in FIG. 11 has a disadvantage of a large system overhead such as an absence or small amount of a resource capable of transmitting data in a beam scanning subframe, etc.

Therefore, the present invention considers that a beam scanning subframe for performing a process for discovering an optimal Tx/Rx beam combination is configured to work to a Tx beam scanning/tracking duration N. in this case, an Rx beam scanning/tracking that should be performed within the corresponding duration more frequently may become a problem. To solve this problem, the following method is proposed.

First Embodiment

According to a first embodiment of the present invention, proposed is that a base station transmits a single preamble or a plurality of preambles (e.g., reference signal or pilot signal) to be utilized for the usage of at least one of the following '1)' and '2)' in a specific time interval of a subframe.

Figure 12:
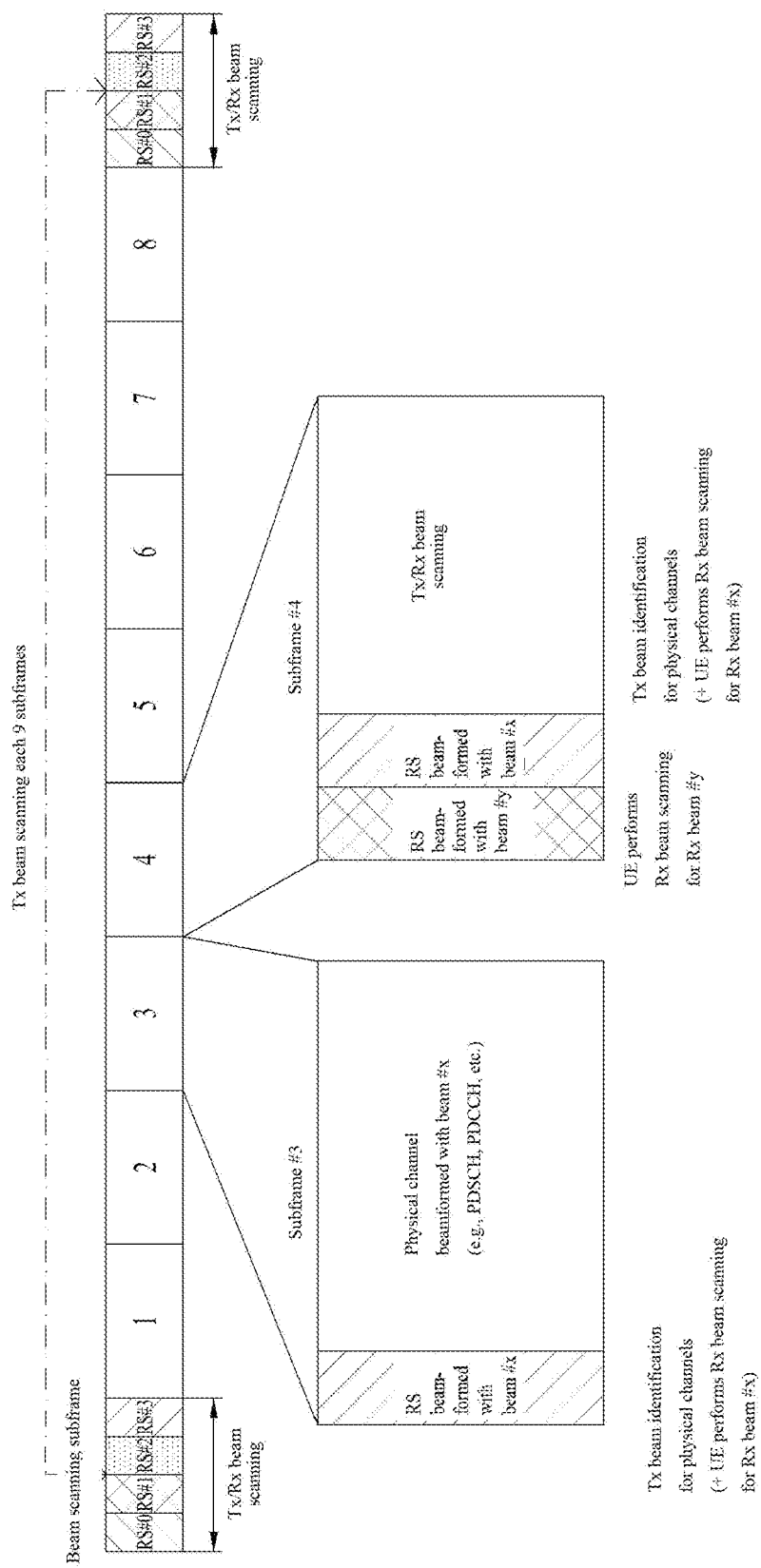
FIG. 12 is a diagram illustrating an example of a frame structure including a preamble for beam scanning according to an embodiment of the present invention.

1) Identification of a Tx beam applied to a physical layer channel (e.g., PDSCH or PDCCH) transmitted in the corresponding subframe 2) Rx beam scanning/tracking usage for a UE that requires Rx beam scanning/tracking within a time faster than Tx beam scanning/tracking FIG. 12 is a diagram illustrating an example of a frame structure including a preamble for beam scanning according to an embodiment of the present invention.

Referring to FIG. 12, it can be observed that a preamble for scanning of Rx beam #x is included in subframe #3. And, it can be observed that a preamble for scanning of Rx beam #x and a preamble for scanning of Rx beam #y are included in subframe #4.

In case of extending a frame structure shown in FIG. 12, it is possible to configure and include a beam scanning subframe by configuring a subframe with a preamble for the usage 2) (and a Tx beam scanning usage). The preamble can be utilized for various purposes, which can be achieved using an existing reference signal, as well as for the above purpose. For example, the preamble can be used for the purposes of CSI (channel state information) estimation on downlink, RRM (radio resource management) measurement such as RSRP/RSRQ/RSSI, and/or channel estimation for demodulation of a physical channel transmitted in the corresponding subframe.

In the frame configuration proposed by the present invention, for efficient beamforming switching at an RF end, a preamble is preferably transmitted in K initial transmission symbols of a subframe.

Particularly, a value of the K is delivered by one of the following methods.

Delivered in signature form in an initial Tx preamble sequence of a corresponding subframe
Delivered in signature form in each preamble sequence (e.g., a presence or non-presence of a preamble transmitted in a very next symbol)
Define a separate physical channel or signal for the usage of indicating the K value
Deliver as upper layer information Moreover, the same Tx beam, which is to be applied to a physical channel (e.g., PDSCH, PDCCH) transmitted in the corresponding subframe), may apply to a preamble transmitted last in the corresponding subframe among the above preambles. In this case, the usage of the preamble preferably employs '1)'.

Meanwhile, the K value may include 0. If K=0, the corresponding subframe may correspond to a case of not applying a specific beamforming [Non-beamformed case] or a case of not using a preamble for the usage 1) [i.e., a case of not transmitting a base station beam ID through RS].

If a proposed preamble signal is used for the purpose of Rx beam-scanning, it may include a multitude of symbols. Namely, in the example of FIG. 10, if a single symbol is configured by a single UE Rx beam unit, the aforementioned single preamble may be configured in form of several sub-preambles, i.e., a multitude of symbols. In this case, the K value may mean the number of preambles or sub-preambles.

Particularly, like the subframe #4 of FIG. 12, if an Rx beam-scanning preamble and a Tx beam identification preamble are transmitted in the same subframe, the Rx beam-scanning preamble may be configured with S symbols having a symbol length of y msec, and the Tx beam identification preamble may be configured with a single symbol having a symbol length of z msec. Here, S is the number of Rx beam candidates. Here, a method of designing by 'z=S x y' is possible. And, a method of designing by 'z=y' is also possible. Eventually, in the latter case, a length of the Rx beam-scanning preamble can be designed S times longer than that of the Tx beam identification preamble.

Second Embodiment

According to a second embodiment, a following method is proposed. First of all, a UE requiring Rx beam scanning/tracking in a time faster than that of Tx beam scanning/tracking among UEs having completed a report or configuration of a preferred Tx beam checks whether a preamble (e.g., reference signal or pilot signal) corresponding to the preferred Tx beam is transmitted in each subframe using Tx beam identification and the like. Secondly, if the corresponding preamble exists, the UE performs scanning/tracking on a Rx beam.

To this end, the preamble preferably has a structure that a signal containing beam ID information is transmitted early. Namely, when the present invention is applied, the faster the beam ID detection is performed, the more Rx beam scanning/tracking time of a UE can be advantageously secured thereafter. Hence, after the signal containing the beam ID information, e.g., a signal configured in signature form in a manner of mapping a beam ID to a sequence has been transmitted early, another signal to which the same Tx beamforming coefficient is applied can be transmitted subsequently.

Moreover, among UEs having completed a report or configuration of a preferred Tx beam, a UE having downlink data or control information to receive checks whether a preamble (e.g., reference signal or pilot signal) corresponding to the preferred Tx beam is transmitted in each subframe using Tx beam identification and the like. If the corresponding preamble exists, the UE can discover data or control information in the corresponding subframe. In this case, the UE matching the preamble for the Tx beam additionally performs scanning/tracking on a Rx beam using the corresponding preamble.

In case of applying the technology of the present invention, a base station can efficiently manage a preamble resource. For now, N is assumed as 7, N is assumed as 3, the number of Tx beam candidates is assumed as 4, the number of UEs is assumed as 10, and the maximum number of UEs in a subframe is assumed as 2. In such a case, a combination of {UE ID, preferred Tx beam ID} can be represented as {0, 0}, {1, 0}, {2, 0}, {3, 0}, {4, 0}, {5, 0}, {6, 1}, {7, 1}, {8, 1}, and {9, 3}. Based on such assumption, an example of a reference signal (RS) and downlink resource allocation is shown per subframe unit as follows.

Subframe #0 (beam scanning subframe): RS#0, RS#1, RS#2, RS#3

Subframe #1: RS#0+DL data (beam #0) for UE #0 and UE #1

Subframe #2: RS#1+DL data (beam #1) for UE #6 and UE #7

Subframe #3: RS#3+DL data (beam #3) for UE #9

Subframe #4: RS#0+DL resource allocation (beam #0) for DL grants for UE #2 and UE #3

Subframe #5: RS#1+DL data (beam #1) for UE #8

Subframe #6: RS#3+RS#0+DL data (beam #0) for UE #4 and UE #5

As observed from the above example, if M is 3 and N is 7(=3), despite that M is much smaller than N, a preamble additionally transmitted for Rx beam scanning/tracking is RS#3 transmitted for beam tracking of UE #9 in subframe #6 only.

Figure 13:
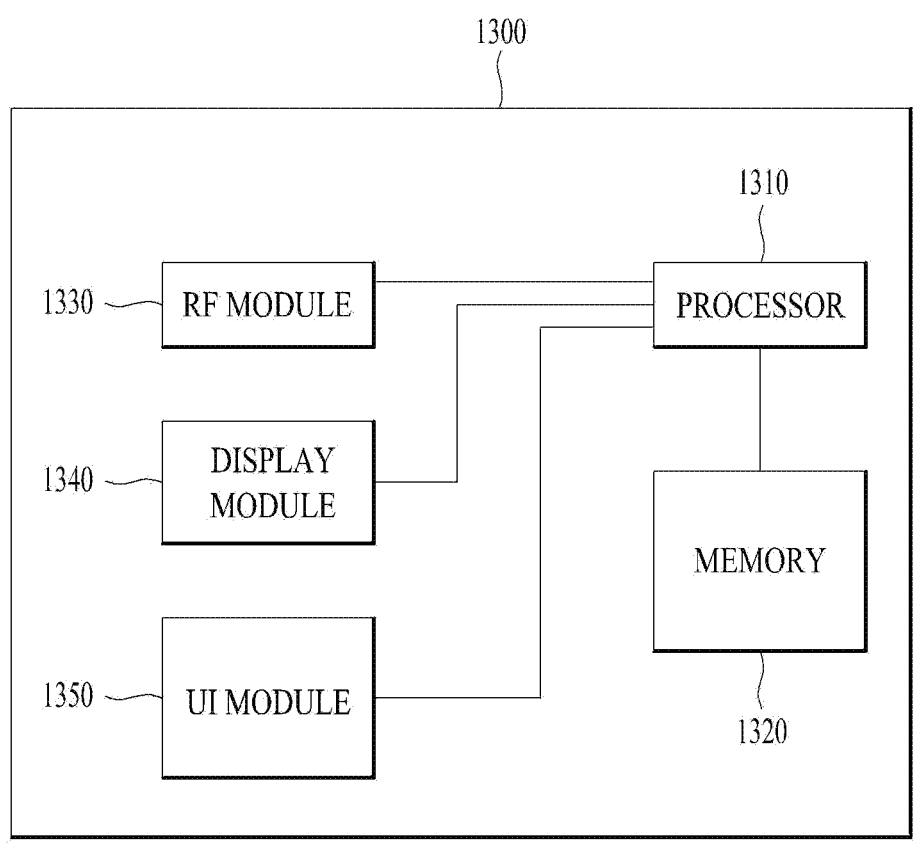
FIG. 13 is a block diagram of a communication apparatus according to an embodiment of the present disclosure.

FIG. 13 is a block diagram of a communication apparatus according to an embodiment of the present disclosure.

Referring to FIG. 13, a communication apparatus 1300 includes a processor 1310, a memory 1320, an RF module 1330, a display module 1340 and a user interface module 1350.

The communication apparatus 1300 is shown for convenience of description and some modules thereof may be omitted. In addition, the communication apparatus 1300 may further include necessary modules. In addition, some modules of the communication apparatus 1300 may be subdivided. The processor 1310 is configured to perform an operation of the embodiment of the present disclosure described with reference to the drawings. For a detailed description of the operation of the processor 1310, reference may be made to the description associated with FIGS. 1 to 12.

The memory 1320 is connected to the processor 1310 so as to store an operating system, an application, program code, data and the like. The RF module 1330 is connected to the processor 1310 so as to perform a function for converting a baseband signal into a radio signal or converting a radio signal into a baseband signal. The RF module 1330 performs analog conversion, amplification, filtering and frequency up-conversion or inverse processes thereof. The display module 1340 is connected to the processor 1310 so as to display a variety of information. As the display module 1340, although not limited thereto, a well-known device such as a Liquid Crystal Display (LCD), a Light Emitting Diode (LED), or an Organic Light Emitting Diode (OLED) may be used. The user interface module 1350 is connected to the processor 1310 and may be configured by a combination of well-known user interfaces such as a keypad and a touch screen.

The above-described embodiments are proposed by combining constituent components and characteristics of the present disclosure according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present disclosure. The order of operations disclosed in the embodiments of the present disclosure may be varied. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

In this document, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the terms fixed station, Node B, eNode B (eNB), access point, etc.

The embodiments of the present disclosure can be implemented by a variety of means, for example, hardware, firmware, software, or a combination thereof. In the case of implementing the present disclosure by hardware, the present disclosure can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present disclosure are implemented by firmware or software, the present disclosure can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A method of receiving a downlink signal transmitted by a user equipment to a base station in a wireless communication system, the method comprising:

receiving a beam scanning subframe configured with a plurality of preambles for a transmission (Tx) beam scan in a first period, from the base station;

selecting a preferred Tx beam corresponding to a single preamble among the plurality of preambles and a preferred reception (Rx) beam corresponding to the preferred Tx beam;

reporting information of the preferred Tx beam to the base station; and receiving a specific subframe configured with the single preamble and a downlink physical channel beamformed with the preferred Tx beam in a second period within the first period.

2. The method of claim 1, wherein the first period is an update period of the preferred Tx beam and the second period is an update period of the preferred Rx beam.

3. The method of claim 1, further comprising updating the preferred Rx beam responding to the preferred Tx beam using the single preamble during the receiving of the specific subframe.

4. The method of claim 1, wherein the specific subframe includes a preamble corresponding to a Tx beam for a different user equipment.

5. The method of claim 4, wherein the single preamble is located at a front end of the downlink physical channel.

6. The method of claim 1, further comprising receiving information on the number of the plurality of preambles from the base station in the first period.

7. A method of transmitting a downlink signal transmitted to a user equipment by a base station in a wireless communication system, the method comprising:

transmitting a beam scanning subframe configured with a plurality of preambles for a transmission (Tx) beam scan in a first period, to the base station;

receiving information on a preferred Tx beam corresponding to a single preamble among the plurality of preambles from the user equipment; and transmitting a specific subframe configured with the single preamble and a downlink physical channel beam-formed with the preferred Tx beam in a second period within the first period, wherein the user equipment selects a preferred reception (Rx beam corresponding to the preferred Tx beam from the beam scanning subframe and the specific subframe.

8. The method of claim 7, wherein the first period is an update period of the preferred Tx beam and the second period is an update period of the preferred Rx beam.

9. The method of claim 7, wherein the specific subframe includes a preamble corresponding to a Tx beam for a different user equipment.

10. The method of claim 9, wherein the single preamble is located at a front end of the downlink physical channel.

11. The method of claim 7, further comprising transmitting information on the number of the plurality of preambles to the user equipment in the first period.

\* \* \* \* \*